(12) United States Patent
Tohara et al.

(10) Patent No.: US 11,112,562 B2
(45) Date of Patent: Sep. 7, 2021

(54) IMAGE DISPLAY DEVICE, OCULAR OPTICAL SYSTEM, AND METHOD OF MANUFACTURING OCULAR OPTICAL SYSTEM

(71) Applicant: CANON KABUSHIKI KAISHA, Tokyo (JP)

(72) Inventors: Masakazu Tohara, Komae (JP); Marina Kitakami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 16/678,279

(22) Filed: Nov. 8, 2019

(65) Prior Publication Data

US 2020/0158953 A1   May 21, 2020

(30) Foreign Application Priority Data

Nov. 16, 2018   (JP) .............................. JP2018-215326

(51) Int. Cl.
*G02B 6/12*   (2006.01)
*G02B 27/01*   (2006.01)
*F21V 8/00*   (2006.01)
*G02B 5/04*   (2006.01)

(52) U.S. Cl.
CPC .......... *G02B 6/12023* (2013.01); *G02B 5/04* (2013.01); *G02B 6/0065* (2013.01); *G02B 6/12033* (2013.01); *G02B 27/0172* (2013.01); *G02B 2006/12116* (2013.01)

(58) Field of Classification Search
CPC .............. G02B 6/12023; G02B 6/0065; G02B 6/12033; G02B 5/04; G02B 27/0172; G02B 2006/12116
See application file for complete search history.

(56) References Cited

U.S. PATENT DOCUMENTS 6,829,112 B2   12/2004   Kobayashi et al.
2007/0024739 A1*   2/2007   Konno ................. H04N 5/2254
348/337

(Continued)

FOREIGN PATENT DOCUMENTS

| JP | H0540203 | 2/1993 |
| JP | H11149003 | 6/1999 |
| JP | 2018010031 | 1/2018 |

*Primary Examiner* — Thomas A Hollweg
*Assistant Examiner* — Mary A El-Shammaa
(74) *Attorney, Agent, or Firm* — Carter, DeLuca & Farrell LLP (57) ABSTRACT

To provide an image display device that is advantageous in terms of a reduction in deterioration in image quality due to birefringence in an optical element of an ocular optical system in which polarized light is used, the image display device includes an ocular optical system including a polarization element and configured to guide light from an image display element toward an eyeball of an observer. The ocular optical system includes at least one optical element that has a forming gate mark in a part of an outer periphery. The forming gate mark is disposed in a direction of an apex of an image display region of the image display element with respect to a point on an optical axis of the ocular optical system in a cross section perpendicular to the optical axis of the ocular optical system.

17 Claims, 8 Drawing Sheets

(56) References Cited

U.S. PATENT DOCUMENTS

2007/0222092 A1* 9/2007 Hayashi .............. G02B 6/0065
264/1.1
2018/0011307 A1 1/2018 Wada
2020/0278548 A1* 9/2020 Jung .................. G02B 27/108

* cited by examiner

IMAGE DISPLAY DEVICE, OCULAR OPTICAL SYSTEM, AND METHOD OF MANUFACTURING OCULAR OPTICAL SYSTEM

BACKGROUND OF THE INVENTION

Field of the Invention

The present invention relates to an image display device, an ocular optical system, and a method of manufacturing the ocular optical system.

Description of the Related Art

Head-mounted displays (HMDs) have been developed for virtual reality (VR) or for single-user purposes to enjoy observation images of large screens. In image display devices in which head-mounted displays or the like are used, wide angle images are preferably presented to carry out natural observation and enhance a realistic sensation. On the other hand, head-mounted image display devices are preferably lightweight.

As technologies for achieving presentation of wide angle images, ocular optical systems in which optical paths are folded using polarized light have been proposed. To reduce weight of an ocular optical system in which polarized light is used, configuring a lens included in the ocular optical system as a resin lens is considered. In the resin lens, however, optical distortion such as birefringence at the time of forming (hereinafter referred to as birefringence for simplicity) may occur. When birefringence occurs in an ocular optical system in which polarized light is used, an adverse influence such as a reduction in the amount of light, light unevenness, or color unevenness can occur. In particular, since birefringence occurring near a forming gate formed at the time of mold forming of a lens is large, quality degrades near the forming gate in the ocular optical system in which polarized light is used.

In Japanese Unexamined Patent Publication No. 2018-10031, an influence of birefringence near a forming gate of a resin lens is reduced by setting the position of the forming gate of the resin lens away from an optical effective region. In Japanese Unexamined Patent Publication No. H05-040203, birefringence is reduced in an optical effective region by providing a non-optical effective region between the optical effective region and the position of the forming gate.

In the resin lens disclosed in Japanese Unexamined Patent Publication No. 2018-10031, however, the position of the forming gate is not in a direction of a maximum field angle of an observed image. Therefore, it is likely that an image affected by birefringence of the position of the forming gate is observed even though the forming gate is away from the optical effective region. In the resin lens disclosed in Japanese Unexamined Patent Publication No. H05-040203, the non-optical effective region is formed between the position of the forming gate and the optical effective region. However, since the position of the forming gate is not in the direction of the maximum field angle as in Japanese Unexamined Patent Publication No. 2018-10031, it is also likely that an image affected by birefringence is observed.

An aspect of the present invention is to provide an image display device that is advantageous, for example, in terms of a reduction in deterioration in quality due to birefringence in an optical element of an ocular optical system in which polarized light is used.

SUMMARY OF THE INVENTION

To solve the foregoing problems, an image display device includes an ocular optical system including a polarization element and configured to guide light from an image display element toward an eyeball of an observer. The ocular optical system includes at least one optical element that has a forming gate mark in a part of an outer periphery. The forming gate mark is disposed in a direction of an apex of an image display region of the image display element with respect to a point on an optical axis of the ocular optical system in a cross section perpendicular to the optical axis of the ocular optical system.

Further features of the present invention will become apparent from the following description of exemplary embodiments with reference to the attached drawings.

DESCRIPTION OF THE EMBODIMENTS

First Embodiment

Hereinafter, embodiments of the present invention will be described in detail with reference to the drawings. In each drawing, the same reference numerals are given to the same members and repeated description will be omitted.

A configuration of an image display device according to a first embodiment will be described with reference to an ocular optical system of the image display device in FIG. 1.

Figure 1:
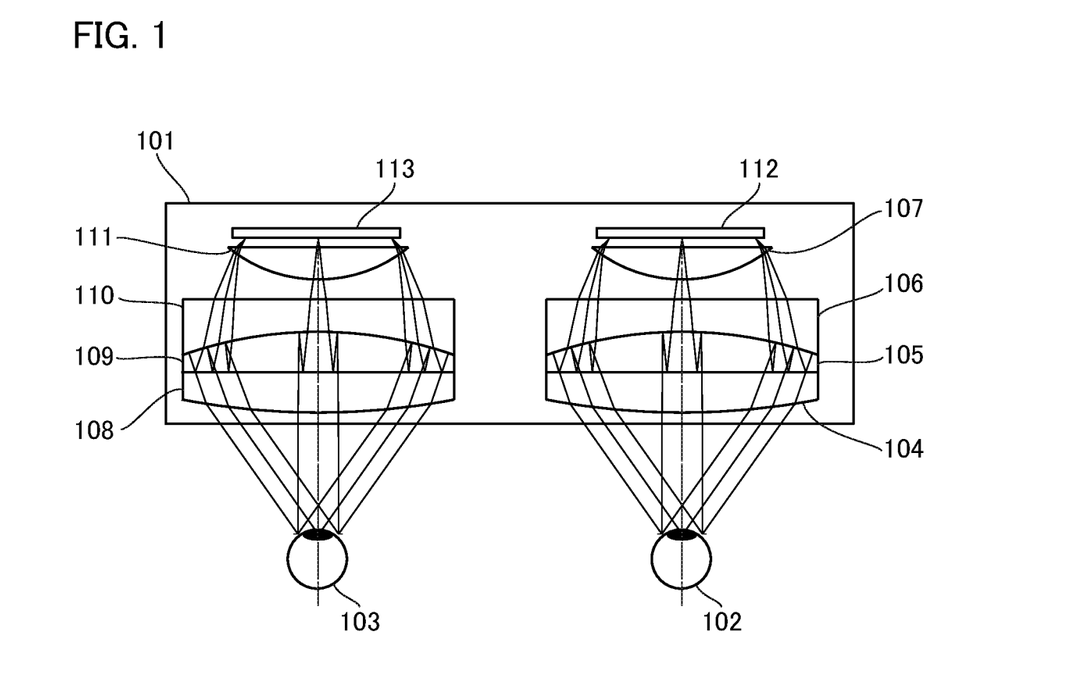
FIG. 1 is a schematic diagram illustrating an image display device according to a first embodiment.

FIG. 1 is a schematic diagram illustrating an image display device according to a first embodiment. In the drawing, reference numeral 101 denotes an HMD which is an image display device, reference numeral 102 denotes the right eye of an observer, and reference numeral 103 denotes the left eye of the observer. Lenses 104, 105, 106, and 107 are included in a right-eye ocular optical system and lenses 108, 109, 110, and 111 are included in a left-eye ocular optical system. Reference numeral 112 denotes a right-eye image display element and reference numeral 113 denotes a left-eye image display element, which are organic EL displays. Regions in which images of the right-eye image display element 112 and the left-eye image display element 113 are displayed (image display regions) are each rectangular.

The right-eye ocular optical system enlarges and projects an original image displayed in the right-eye image display element 112 and guides the image to the right eye 102 of the observer. The left-eye ocular optical system enlarges and projects an original image displayed in the left-eye image display element 113 and guides the image to the left eye 103 of the observer. In the right-eye ocular optical system and the left-eye ocular optical system, a horizontal display field angle is 70°, a vertical display field angle is 40°, and a diagonal display field angle is 76°. A distance between an eyeball of the observer and the HMD 101 (eye relief) is 20 mm.

Figure 2:
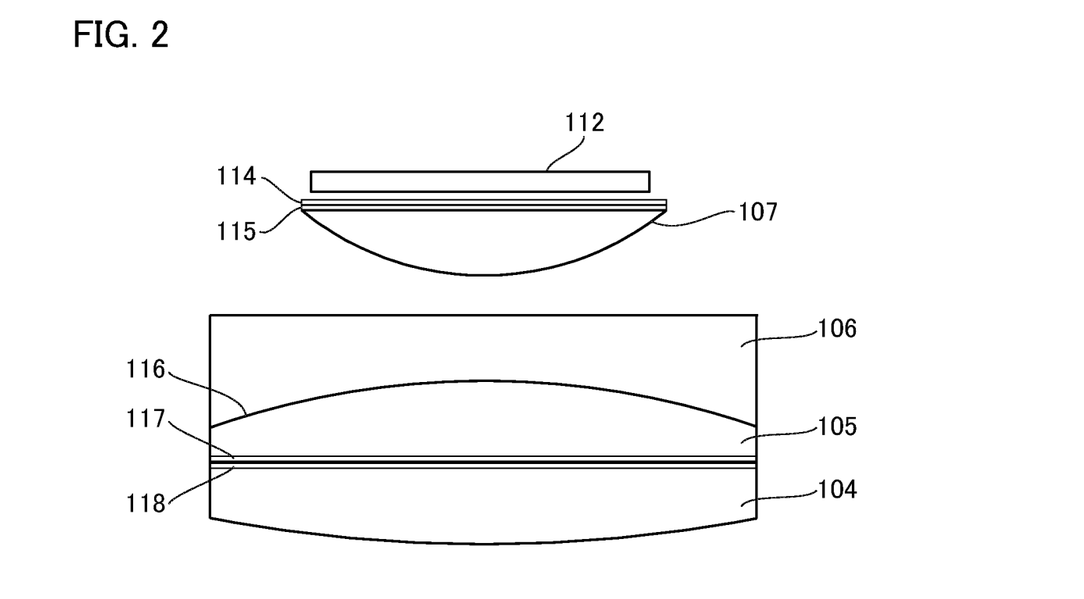
FIG. 2 is a diagram illustrating the details of an ocular optical system according to the first embodiment.

The ocular optical system according to the embodiment is an optical system which includes a polarizer and in which optical paths are folded using polarized light. In the present specification, the polarizer is an optical element which includes a wavelength plate (phase difference imparting member) such as a λ/4 wavelength plate or a λ/2 wavelength plate or a polarization plate such as a reflective polarization plate or a transmissive polarization plate, and in which an optical function is changed in accordance with a polarization direction of light. The polarizer includes an optical element that has a polarization function such as a liquid crystal display element. The right-eye ocular optical system will be representatively described with regard to optical paths of the ocular optical system according to the embodiment. FIG. 2 is a diagram illustrating the details of the ocular optical system according to the first embodiment. First, as in FIG. 2, a polarization plate 114 and a λ/4 plate 115 are formed in order from the side of the right-eye image display element 112 on a flat surface of the lens 107 on the side of the right-eye image display element 112, and a half-mirror 116 is formed on the surface of the lens 105 on the side of the lens 106 by vapor deposition. The surface on which the half mirror 116 is deposited operates as a semi-transmission reflection surface and is a surface that has the strongest optical power in the ocular optical system.

On the flat surface of the lens 105 on the side of the lens 104, a λ/4 plate 117 and a polarizing beam splitter (PBS) 118 of the reflection polarization plate are formed in order from the side of the right-eye image display element 112.

At this time, a slow axis of the λ/4 plate 115 and a slow axis of the λ/4 plate 117 have an orthogonal relation. Accordingly, when the polarization direction in which light is transmitted through the polarization plate 114 and the slow axis of the λ/4 plate 115 are sloped at 45°, the polarization direction in which light is transmitted through the polarization plate 114 and the slow axis of the λ/4 plate 117 are sloped at −45°. The polarization direction in which light is transmitted through the polarization plate 114 and the polarization direction in which light is transmitted through the PBS 118 are orthogonal to each other. Here, the slope of the slow axis at 45° or the slope of the slow axis at −45° may be substantially 45° or −45°. For example, an absolute value of the slope may be equal to or greater than 40° and equal to or less than 50° and may be preferably equal to or greater than 43° and equal to or less than 47°. The positive direction of the slope is assumed to be a clockwise direction and the negative direction of the slope is assumed to be a counter-clockwise direction. In the following description of 45°, a similar width is assumed to be held.

In the case of this configuration, light emitted from the right-eye image display element 112 is transmitted through the polarization plate 114 to become linearly polarized and is transmitted through the λ/4 plate 115 to become circularly polarized light. The light is transmitted to the half mirror 116 and then transmitted through the λ/4 plate 117 to become linearly polarized light, and the polarization direction of the linearly polarized light is orthogonal to the polarization direction of the light which can be transmitted through the PBS 118. Therefore, the light is reflected from the PBS 118 and transmitted through the λ/4 plate 117 to become circularly polarized light. The light is then reflected by the half mirror 116 and transmitted again through the λ/4 plate 117 to become linearly polarized light. Since the polarization direction of the linearly polarized light matches the polarization direction in which the light can be transmitted through the PBS 118 unlike before, the light is transmitted through the PBS 118 to be guided to the right eye 102 of the observer. Similar optical paths apply to the left-eye ocular optical system.

By realizing the optical system in which optical paths are folded using the polarized light as in the embodiment, it is possible to shorten a focal distance of the ocular optical system to make the system thin and it is possible to realize observation of a wide angle image.

Figure 3:
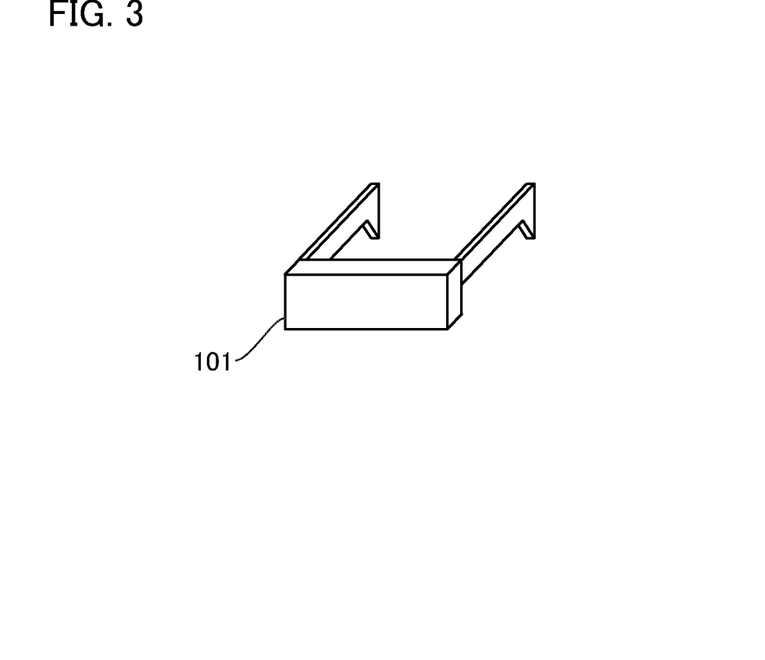
FIG. 3 is an external view illustrating an HMD.

FIG. 3 is an external view illustrating an HMD 101. Since the HMD 101 is a head-mounted image display device, the HMD 101 is preferably lightweight. Therefore, lenses included in an ocular optical system are preferably made of a resin that has a lower specific gravity than glass. In the embodiment, all the lenses are resin lenses.

Figure 4:
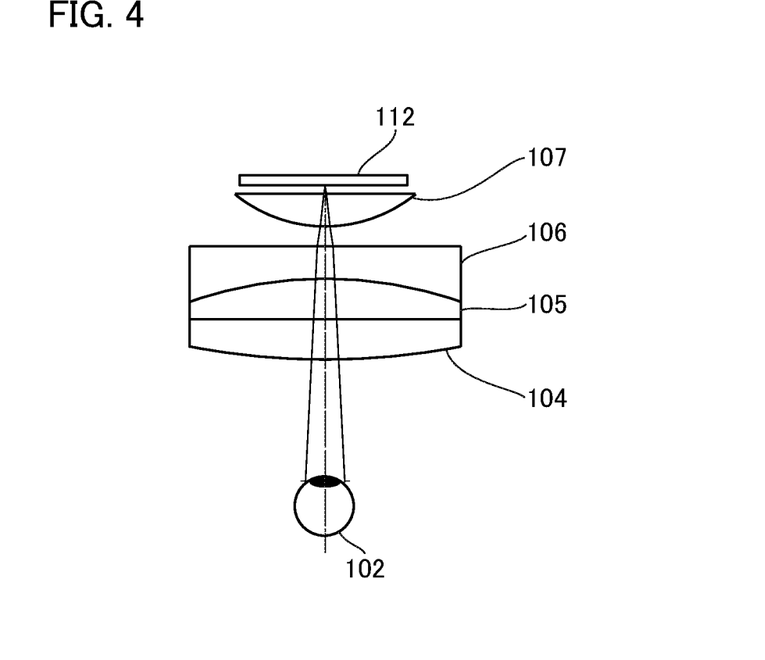
FIG. 4 is a diagram illustrating ghost light.

However, when a resin lens is manufactured by mold-forming, birefringence occurs due to an influence of residual stress at the time of forming. In the case of an optical system in which polarized light is used as in the embodiment, light use efficiency of the regular optical paths described above is lowered due to birefringence inside the lenses and the light use efficiency also differs for each wavelength. Thus, a reduction in the amount of light, light unevenness, or color unevenness of an observed image may occur. In light to be reflected from the PBS 110 in the regular optical paths, a ratio of light transmitted through the PBS 110 may increase due to an influence of birefringence, and thus ghost light in which light from the display element is guided directly to the eyes of an observer as in FIG. 4 may occur. Therefore, it is necessary to reduce the birefringence of the resin lenses included in the ocular optical system as much as possible.

In the embodiment, when resin lenses are formed, a region in which birefringence increases near a forming gate (a distorted region) occurs. Therefore, visibility of an optical path near the forming gate deteriorates. Accordingly, by arranging the position of the forming gate away from an optical effective region so that the position of the forming gate can be inconspicuous in an observed image, it is possible to reduce an influence of the degradation of quality due to the birefringence near the forming gate. Here, the forming gate of the lens (or a forming gate trace or a forming gate mark) is a part of the lens in which a trace (or a mark) of a gate for flowing a material (a resin or a glass material)

into inside of a mold at the time of mold-forming. All the optical elements have forming gates as long as the optical elements are formed by the mold-forming. Thus, those skilled in the art easily know where the forming gates of the optical elements are formed (where a gate of the mold is located when the optical elements are formed). Specifically, various cases in which a part bulges more than other parts in the periphery of a lens, a part of a lens is rougher than other parts, a part of a lens has a different shape from the other parts can be considered. In a case where the forming gate or the forming gate trace (or mark) has been cut off, a position closest to the forming gate mark is a position (region) that has the highest birefringence amount in an optical element. Accordingly, the forming gate trace (or mark) may be regarded as a portion (region) that has the most birefringence (or optical distortion) in an optical element.

When a material of a lens is a resin, birefringence occurring near a gate at the time of mold-forming of a lens is particularly considerably large. Therefore, in the embodiment, a resin lens will be described as an example, but the present invention is not limited thereto. Even in a glass lens, birefringence occurs in some cases. This problem is common to all optical elements including lenses as far as the optical elements are formed by mold-forming. The present invention can be applied to any optical element formed by mold-forming.

Figure 5A:
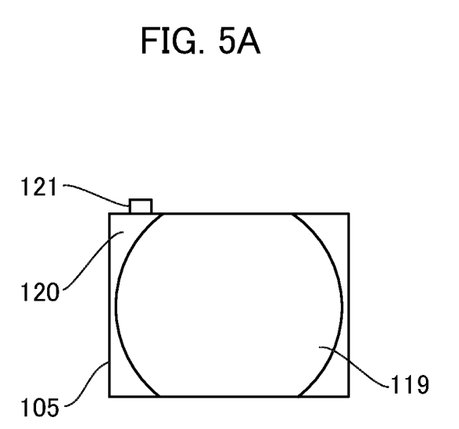
FIGS. 5A and 5B are diagrams illustrating the position of a forming gate of a lens of a right-eye ocular optical system according to the first embodiment.
Figure 5B:
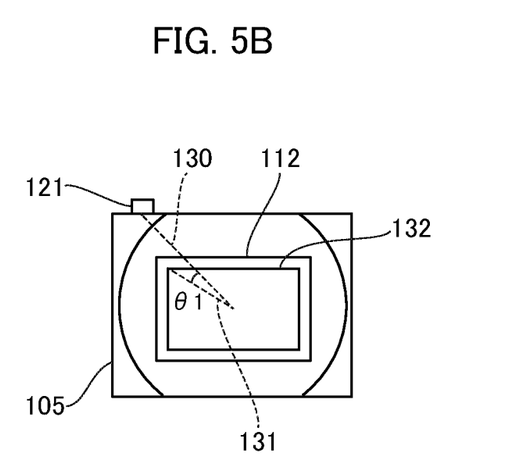

FIGS. 5A and 5B are diagrams illustrating the position of a forming gate of a lens 105 of a right-eye ocular optical system according to the first embodiment. FIG. 5A is a diagram illustrating an example of a position of a forming gate of the lens 105. A forming gate 121 is formed in a part of the outer periphery of the lens 105. A non-optical effective region (non-effective region) 120 is formed between an optical effective region (effective region) 119 and the forming gate 121. Due to the presence of the non-optical effective region (non-effective region) 120, a distance between the optical effective region 119 and the forming gate 121 can be great. Thus, even when birefringence is large near the forming gate 121, an influence of the birefringence is hardly imparted to the optical effective region 119.

As illustrated in FIG. 5B, the forming gate 121 is disposed in a direction of an apex (hereinafter referred to simply as an apex direction) of a rectangular image display region 132 of the image display element 112 with respect to a point on an optical axis. That is, when the lens 105 is incorporated in the right-eye ocular optical system, the lens 105 is incorporated so that the forming gate 121 and a distorted region formed near the forming gate 121 are disposed in the apex direction of the rectangular image display region 132 of the image display element 112 with respect to a point on the optical axis. The apex of the image display region 132 is an apex of an observable region in which the image display element 112 can display an image. In the embodiment, a straight line connecting the center of the forming gate 121 to a point on the optical axis in the cross section perpendicular to the optical axis is referred to as a straight line 130. A straight line connecting the point on the optical axis to the apex of the image display region 132 closest to the forming gate 121 is referred to as a straight line 131. An angle θ1 formed by the straight lines 130 and 131 is 20° and the forming gate 121 is regarded as being disposed in the apex direction of an observed image.

The apex direction in the observed image is a direction in which a field angle is the largest. Even when quality degrades due to birefringence in that direction, the birefringence is hardly conspicuous. Therefore, the straight line 130 connecting the center of the forming gate 121 to the point on the optical axis in the cross section (flat surface) perpendicular to the optical axis and the straight line 131 connecting the point on the optical axis to the apex of the image display region 132 closest to the forming gate 121 are preferably oriented in substantially the same direction. Specifically, an absolute value of the angle θ1 (θA) formed by the straight lines 130 and 131 is preferably equal to or less than 30 degrees, that is, $|\theta A| \leq 30°$ is preferably satisfied. More preferably, $|\theta A| \leq 7°$ is satisfied. Here, when the absolute value of the angle θ1 (θA) exceeds 30°, quality degrades due to birefringence near the forming gate at a field angle on the inner side of a maximum field angle and an observer may easily find the degradation. Here, in addition to θ1 described in the embodiment, angles θ2, θ3, θ4, θ6, and θ7 to be described below correspond to the above-described angle θA, and thus satisfy the above-described conditional expression.

As a method of reducing birefringence near the forming gate, a method of increasing a cross-sectional area of the forming gate is considered. In the embodiment, a cross-sectional area S of the forming gate of the lens 105 is 3 mm×2 mm=6 mm². To reduce an influence of birefringence near the forming gate in the optical effective region, a method of disposing the position of the forming gate away from the optical effective region is considered. A shortest distance L between the optical effective region 119 and the forming gate 121 is 8 mm. Therefore, $L/S^{1/2}$ of the lens 105 is 3.26.

As in the embodiment, $L/S^{1/2}$ of the resin lens is preferably equal to or greater than 1 and equal to or less than 4. When this value is less than 1, the position of the forming gate and the optical effective region are too close to each other or the cross-sectional area of the forming gate is too large. In the former case, birefringence near the forming gate affects the optical effective region and the quality of images deteriorates. In the latter case, the resin lens becomes thick and the ocular optical system does not become thin and is heavy, or the width of the forming gate is large and the range of the influence of the birefringence spreads.

When $L/S^{1/2}$ is greater than 4, the position of the forming gate and the optical effective region are too far apart or the cross-sectional area of the forming gate is too small. In the former case, the outer shape of the resin lens increases and the ocular optical system increases in size and is heavy. In the latter case, the cross-sectional area of the forming gate is too small and birefringence near the forming gate increases.

As illustrated in FIGS. 5A and 5B, the forming gate 121 of the lens 105 is disposed on the top left as viewed by an observer in a state where the observer wears the HMD 101. The reason for disposing the forming gate on the upper side is that a field of human vision is wider on a lower side than on an upper side, and there are many more opportunities to observe the lower side than the upper side in a usual situation. Therefore, when degradation of quality occurs due to birefringence, it is more difficult for an observer to recognize the degradation of the quality on the upper side than on the lower side. Therefore, the forming gate is preferably disposed on the upper side.

It is also preferable to dispose the position of a forming gate of resin lenses other than the lens 105 similarly to the lens 105. When lenses are relatively small like the lenses 107 and 111 in the embodiment, a difference in weight between a glass lens and a resin lens is small. Therefore, all the lenses of the HMD may not be resin lenses, but glass lenses and resin lenses may be combined. In that case, since birefringence of a glass lens is very small, a high-quality image can be observed.

The lenses 104, 105, and 106 or the lenses 108, 109, and 110 may be adhered to form an integrated lens so that it is easy to retain the lenses. In the embodiment, the areas of the polarization plate 114 and the λ/4 plate 115 are set to be small and are formed in the lens 107 to reduce cost. However, to reduce an angle of incidence on the polarization plate and the λ/4 plate and realize a good polarization property, the polarization plate and the λ/4 plate may be formed on a flat surface of the lens 106 on the side of the image display element 112. To reduce unnecessary ghost light and enhance contrast of an observed image, a polarization plate may be disposed between the PBS and an eyeball of an observer.

The PBS 118 is formed on the flat surface of the lens 105, but may be formed with a curved surface on the surface of the lens 104 on the eye side. In this way, the lenses 104 and 105 can be integrated, and thus the number of lenses can be reduced to realize a reduction in size and a reduction in cost. The polarization plate 114 and the λ/4 plate 115 may not be formed in the lens 107, but may be disposed between the lens 107 and the right-eye image display element 112.

In the embodiment, the image display element is an organic EL element that is an image display element radiating unpolarized light. However, by realizing the image display element as a liquid crystal display radiating linearly polarized light, it is possible to realize a reduction in size and a reduction in cost since the polarization plate 114 on the image display element side is not necessary.

Second Embodiment

Figure 6:
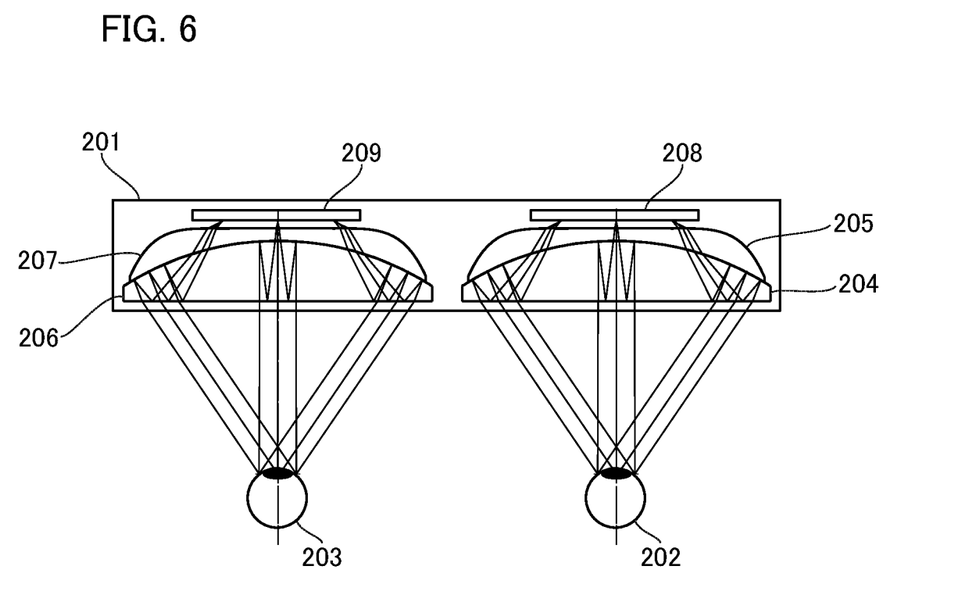
FIG. 6 is a schematic diagram illustrating an image display device according to a second embodiment.

A configuration of an image display device according to a second embodiment will be described with reference to an ocular optical system of an image display device in FIG. 6. FIG. 6 is a schematic diagram illustrating an image display device according to a second embodiment. In the drawing, reference numeral 201 denotes an HMD, reference numeral 202 denotes the right eye of an observer, and reference numeral 203 denotes the left eye of the observer. Lenses 204 and 205 are included in a right-eye ocular optical system and lenses 206 and 207 are included in a left-eye ocular optical system. Reference numeral 208 denotes a right-eye image display element and reference numeral 209 denotes a left-eye image display element, which are organic EL displays.

The right-eye ocular optical system enlarges and projects an original image displayed in the right-eye image display element 208 and guides the image to the right eye 202 of the observer. The left-eye ocular optical system enlarges and projects an original image displayed in the left-eye image display element 209 and guides the image to the left eye 203 of the observer. In the right-eye ocular optical system and the left-eye ocular optical system, a horizontal display field angle is 60°, a vertical display field angle is 60°, and a diagonal display field angle 78°. An eye relief is 18 mm.

The ocular optical system according to the embodiment is an optical system in which optical paths are folded up using polarized light as in the first embodiment. The optical paths will be described using the right-eye ocular optical system. First, a polarization plate and a λ/4 plate are formed in order from the side of the right-eye image display element 208 between the lens 205 and the right-eye image display element 208 and a half-mirror is formed on the surface of the lens 204 on the side of the lens 205 by vapor deposition. The surface on which the half mirror is deposited operates as a semi-transmission reflection surface and is a surface that has the strongest optical power in the ocular optical system. On the flat surface of the lens 204 on the side of the right eye 202 of the observer, a λ/4 plate and a PBS of the reflection polarization plate are formed in order from the side of the right-eye image display element 208. At this time, the lens 205 and a slow axis of the λ/4 plate on the side of the right-eye image display element 208, and a slow axis of the λ/4 plate on the side of the right eye 202 of the observer have an orthogonal relation. Accordingly, when the polarization direction in which light is transmitted through the polarization plate between the lens 205 and the side of the right-eye image display element 208, and the slow axis of the λ/4 plate are sloped at 45°, the slow axis of the λ/4 plate of the flat surface of the lens 204 on the side of the right eye 202 of the observer are sloped at −45°. The polarization direction in which light is transmitted through the polarization plate between the lens 205 and the side of the right-eye image display element 208 and the polarization direction in which light is transmitted through the PBS are orthogonal to each other.

In the case of the above configuration, light emitted from the right-eye image display element 208 is transmitted through the polarization plate to become linearly polarized and is transmitted through the λ/4 plate to become circularly polarized light. The light is transmitted through the half mirror and is transmitted through the λ/4 plate to become linearly polarized light, and the polarization direction of the linearly polarized light is orthogonal to the polarization direction of the light that can be transmitted through the PBS. Therefore, the light is reflected from the PBS and is transmitted through the λ/4 plate to become circularly polarized light. The light is then reflected from the half mirror and is transmitted through the λ/4 plate to become linearly polarized light. However, since the polarization direction of the linearly polarized light matches the polarization direction in which the light can be transmitted through the PBS, the light is transmitted through the PBS to be guided to the right eye 202 of the observer. Similar optical paths apply to the left-eye ocular optical system.

By realizing the optical system in which optical paths are folded up using the polarized light as in the embodiment, it is possible to shorten a focal distance of the ocular optical system to make the system thin and it is possible to realize observation of a wide angle image. Since the HMD 201 is a head-mounted image display device, the weight of the HMD 201 is preferably lightweight. Therefore, lenses included in an ocular optical system are preferably made of a resin that has a lower specific gravity than glass. In the embodiment, all the lenses are resin lenses.

Figure 7A:
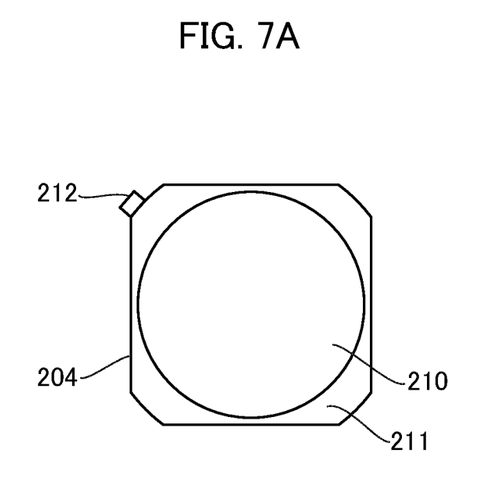
FIGS. 7A and 7B are diagrams illustrating the position of a forming gate of a lens 204 according to the second embodiment.
Figure 7B:
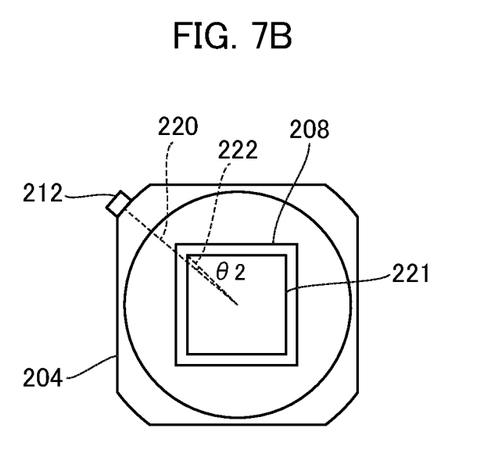

FIGS. 7A and 7B are diagrams illustrating the position of a forming gate of the lens 204 of the right-eye ocular optical system according to the second embodiment. The position of the forming gate of the lens 204 of the right-eye ocular optical system will be described with reference to FIG. 7A. FIG. 7A is a diagram illustrating an example of a position of the forming gate of the lens 204. A forming gate 212 is disposed in a part of the outer periphery of the lens 204. A non-optical effective region 211 is disposed in the periphery of an optical effective region 210 and the forming gate 212 is disposed outside the non-optical effective region 211. Due to the presence of the non-optical effective region 211, the optical effective region 210 and the forming gate 212 are away from each other. Thus, even when birefringence is large near the forming gate 212, an influence of the birefringence is hardly imparted to the optical effective region 210.

As illustrated in FIG. 7B, a line 220 is a straight line connecting the center of the forming gate 212 to a point on the optical axis of the lens 204 in the cross section perpendicular to the optical axis. A line 222 is a straight line connecting a point on the optical axis of the lens 204 to an apex of the image display region 221 closest to the forming gate 212. An absolute value of an angle θ2 formed between the straight lines 220 and 222 is 5° and the forming gate 212 is disposed in an apex direction of an observed image. The apex direction in the observed image is a direction in which a field angle is the largest. Even when quality degrades due to birefringence in the direction, the birefringence is hardly conspicuous. Therefore, an absolute value of the angle between a direction oriented from the point on the optical axis to the center of the forming gate 212 in the cross section perpendicular to the optical axis and a diagonal direction closet to the forming gate 212 of the right-eye image display element 208 is preferably equal to or less than 30°. More preferably, the absolute value of the angle is equal to or less than 7°.

As a method of reducing birefringence near the forming gate, a method of increasing a cross-sectional area of the forming gate is considered. A cross-sectional area S of the forming gate of the lens 204 is 5 mm×1.6 mm=8 mm². To reduce an influence of birefringence near the forming gate in the optical effective region, a method of keeping the position of the forming gate away from the optical effective region is also considered. A shortest distance L between the optical effective region 210 and the forming gate 212 is 3.5 mm. Therefore, $L/S^{1/2}$ of the lens 204 is 1.2.

Figure 8A:
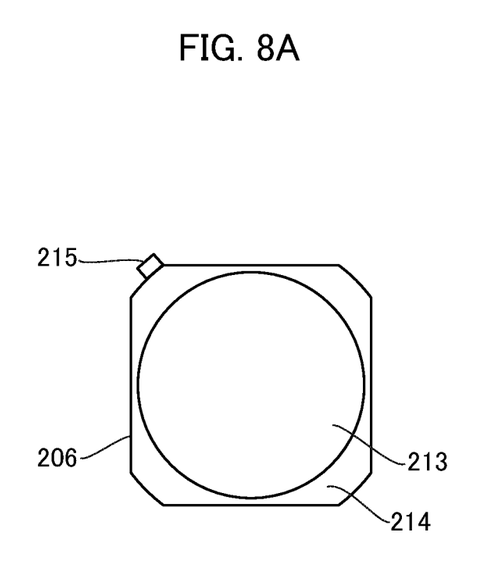
FIGS. 8A and 8B are diagrams illustrating the position of a forming gate of a lens 206 according to the second embodiment.
Figure 8B:
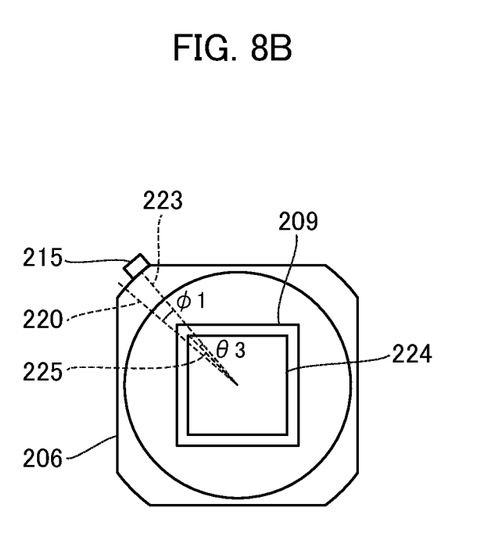

Next, the position of the forming gate of the lens 206 of the left-eye ocular optical system will be described with reference to FIGS. 8A and 8B. FIGS. 8A and 8B are diagrams illustrating the position of a forming gate of a lens 206 of the left-eye ocular optical system according to the second embodiment. FIG. 8A is a diagram illustrating an example of the position of the forming gate of the lens 206. A forming gate 215 is formed in a part of the outer periphery of the lens 206. A non-optical effective region 214 is formed in the periphery of an optical effective region 213 and the forming gate 215 is disposed outside the non-optical effective region 214. As described above, in this way, even when birefringence is large near the forming gate 215, an influence of the birefringence is hardly imparted to the optical effective region 213.

As illustrated in FIG. 8B, a straight line 223 is a straight line connecting the center of the forming gate 215 to a point on the optical axis of the lens 206 in the cross section perpendicular to the optical axis. A straight line 225 is a straight line connecting a point on the optical axis of the lens 206 to an apex of the image display region 224 closest to the forming gate 215. An absolute value of an angle θ3 formed between the straight lines 223 and 225 is 5° and the forming gate 215 is disposed in an apex direction of an observed image. The apex direction in the observed image is a direction in which a field angle is the largest. Even when quality degrades due to birefringence in the direction, the birefringence is hardly conspicuous.

A cross-sectional area S of the forming gate of the lens 206 is 5 mm×1.6 mm=8 mm². A shortest distance L between the optical effective region 213 and the forming gate 215 is 3.5 mm. Therefore, $L/S^{1/2}$ of the lens 206 is 1.2.

As illustrated in FIGS. 7A to 8B, in the embodiment, the positions of the forming gates of the left and right lenses are aligned on the upper left side. This is because when the observer observes images of which the influences of the birefringence are similar on the left and right images at the time of observing the HMD, the observer can observe fused images with both eyes comfortably. If locations at which quality degrades due to the influence of birefringence are considerably different on the left and right images due to a difference in the position of the forming gate between the left and right lenses, the observer may not observe the fused images comfortably due to occurrence of visual rivalry when the observer observes the fused images with both eyes. In addition, the observer often recognizes a worse image from the images of which quality degrades on the right and left images and recognizes as if both the left and right images were the same as the worse image.

Therefore, the positions of the forming gates of the left and right lenses are preferably close. In the embodiment, an absolute value of a difference between the straight line 220 connecting the center of the forming gate 212 to the point on the optical axis of the lens 204 in the cross section perpendicular to the optical axis and the straight line 223 connecting the center of the forming gate 215 to the point on the optical axis of the lens 206 is 10°. In other words, when the point on the optical axis of the lens 204 and the point on the optical axis of the lens 206 overlap, an absolute value of an angle φ1 formed between the straight lines 220 and 223 is 10°. In FIGS. 8A and 8B, to facilitate the description, the straight line 220 connecting the center of the forming gate 212 to the point on the optical axis of the lens 204 is illustrated. An absolute value of the angle φ1 is equal to or less than 30°. That is, |φ|≤30° is preferably satisfied and is more preferably equal to or less than 15°. By satisfying such a condition, a positional relationship of the forming gates of the left and right lenses are similar and the images in which the influences of the birefringence are similar on the left and right sides are observed when the observer observes the HMD. Thus, the observer can observe the fused images comfortably with both eyes. Here, the angle φ1 described in the embodiment and an angle φ2 to be described below correspond to the above-described angle φ, and the above-described conditional expression is satisfied.

Figure 9A:
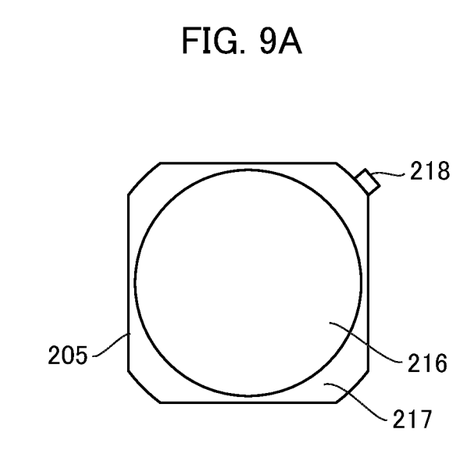
FIGS. 9A and 9B are diagrams illustrating the position of a forming gate of a lens 205 according to the second embodiment.
Figure 9B:
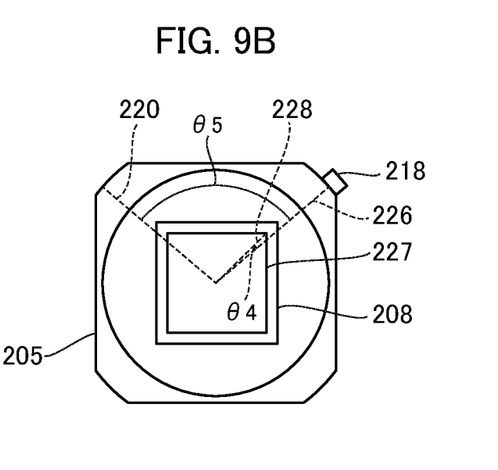

The position of the forming gate of the lens 205 of the right-eye ocular optical system will be described with reference to FIGS. 9A and 9B. As illustrated in FIG. 6, the lens 205 is a lens through which the same light as that of the lens 204 passes (both the lenses are for the right eye). FIGS. 9A and 9B are diagrams illustrating the position of a forming gate of the lens 205 of the right-eye ocular optical system according to the second embodiment. FIG. 9A is a diagram illustrating an example of the position of the forming gate of the lens 205. A forming gate 218 is formed in a part of the outer periphery of the lens 205. A non-optical effective region 217 is formed in the periphery of an optical effective region 216 and the forming gate 218 is disposed outside the non-optical effective region 217. As described above, in this way, even when birefringence is large near the forming gate 218, an influence of the birefringence is hardly imparted to the optical effective region 216.

As illustrated in FIG. 9B, a line 226 is a straight line connecting the center of the forming gate 218 to a point on the optical axis of the lens 205 in the cross section perpendicular to the optical axis. A line 228 is a straight line connecting a point on the optical axis of the lens 205 to an apex of the image display region 227 closest to the forming gate 218. An absolute value of an angle θ4 formed between the straight lines 226 and 228 is 5° and the forming gate 218 is disposed in an apex direction of an observed image. The apex direction in the observed image is a direction in which a field angle is the largest. Even when quality degrades due to birefringence in the direction, the birefringence is hardly conspicuous.

A cross-sectional area S of the forming gate 218 of the lens 205 is 5 mm×2 mm=10 mm$^2$. A shortest distance L between the optical effective region 216 and the forming gate 218 is 11 mm. Therefore, $L/S^{1/2}$ of the lens 205 is 3.5.

As illustrated in FIGS. 7A, 7B, 9A, and 9B, the positions of the forming gates of the lenses 204 and 205 included in the right-eye ocular optical system according to the embodiment are positions away on the left and right sides (symmetry positions). This is because the birefringence near the gate of the lens 204 and the birefringence near the gate of the lens 205 are designed not to be added. If the positions of the forming gates of the lenses 204 and 205 are close to each other, the birefringence near the gates of the two lenses is added and degradation of quality increases. Therefore, since a difference in the quality between the upper left and the upper right of the image increases, discomfort may occur at the time of observation.

In the embodiment, the line 220 is a straight line connecting the center of the forming gate 212 of the lens 204 to a point on the optical axis of the right-eye ocular optical system in the cross section perpendicular to the optical axis. A line 226 is a straight line connecting a point on the optical axis of the right-eye ocular optical system to the center of the forming gate 218 of the lens 205. An absolute value of an angle θ5 (θB) formed between the straight lines 220 and 226 is 100°. In FIGS. 9A and 9B, to facilitate the description, the straight line 220 connecting the center of the forming gate 212 to the point on the optical axis of the right-eye ocular optical system is illustrated. By setting the positions of the gates of the lenses 204 and 205 to positions away on the upper left and the upper right sides, the birefringence near each gate is designed not to be added, the degradation of the quality is suppressed to be small, and a difference in quality between the upper left and upper right of the image can also be decreased.

Therefore, the absolute value of an angle θ5 (θB) formed between the straight lines 220 and 226 is equal to or greater than 60° and equal to or less than 120°, that is, 60°≤|θB|≤120° is preferably satisfied. More preferably, the absolute value of the angle is equal to or greater than 75° and equal to or less than 105°. When the absolute value is less than 60°, the position of the forming gate of each lens is near when viewed by the right eye, the birefringence near the forming gate is partly added, and degradation of the quality increases. Here, an angle corresponding to the angle θB is the above-described angle θ5. When the absolute value is larger than 120°, the position of the forming gate of either lens is away from the maximum field angle in the diagonal direction, the degradation of the quality due to the birefringence is conspicuous. Here, the right-eye ocular optical system that includes, for example, the lens 204 serving as a first resin lens including the forming gate 212 and the lens 205 serving as a second resin lens including the forming gate 218 in a part of the outer periphery has been described as an example. The configuration of the first and second resin lenses for the right-eye ocular optical system may be the same as that of the first and second resin lenses of the left-eye ocular optical system. Accordingly, similarly, the positions of the forming gates of the lenses 206 and 207 included in the left-eye ocular optical system are preferably positions away on the upper left and the upper right sides.

As illustrated in FIGS. 7A, 7B, 8A, 8B, 9A, and 9B, in the embodiment, the forming gates of all the lenses included in the ocular optical system are disposed on the upper side as in the first embodiment. The reason for disposing the forming gate on the upper side is the same as that of the first embodiment.

In the embodiment, the lenses 204 and 205 or the lenses 206 and 207 are integrated lenses, but may be separated lenses. To reduce unnecessary ghost light and enhance contrast of an observed image, a polarization plate may be disposed after the PBS. In the embodiment, the image display element is the image display element that radiates unpolarized light as an organic EL. However, when a liquid crystal display is used instead of the organic EL and by radiating linearly polarized light, a polarization plate on the side of the image display element may be omitted so that a reduction in cost and a reduction in size can be realized.

Third Embodiment

Figure 10:
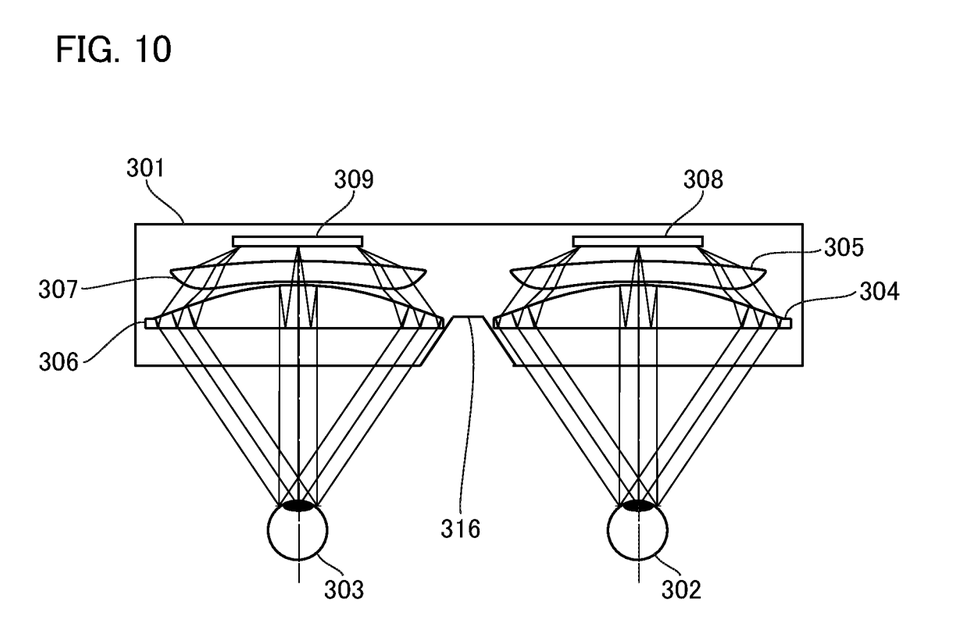
FIG. 10 is a schematic diagram illustrating an image display device according to a third embodiment.

A configuration of an image display device according to a third embodiment will be described with reference to an ocular optical system of an image display device in FIG. 10. FIG. 10 is a schematic diagram illustrating an image display device according to the third embodiment. In the drawing, reference numeral 301 denotes an HMD, reference numeral 302 denotes the right eye of an observer, and reference numeral 303 denotes the left eye of the observer. Lenses 304 and 305 are included in a right-eye ocular optical system and lenses 306 and 307 are included in a left-eye ocular optical system. Reference numeral 308 denotes a right-eye image display element and reference numeral 309 denotes a left-eye image display element, which are organic EL displays.

The right-eye ocular optical system enlarges and projects an original image displayed in the right-eye image display element 308 and guides the image to the right eye 302 of the observer. The left-eye ocular optical system enlarges and projects an original image displayed in the left-eye image display element 309 and guides the image to the left eye 303 of the observer. In the right-eye ocular optical system and the left-eye ocular optical system, a horizontal display field angle is 65°, a vertical display field angle is 65°, and a diagonal display field angle 84°. An eye relief is 18 mm.

The ocular optical system according to the embodiment is an optical system in which optical paths are folded up using polarized light as in the first and second embodiments. The optical paths will be described in the right-eye ocular optical system. First, a polarization plate and a λ/4 plate are formed in order from the side of the right-eye image display element 308 between the lens 305 and the right-eye image display element 308, and a half-mirror is deposited on the surface of the lens 304 on the side of the lens 305. The surface on which the half mirror is deposited operates as a semi-transmission reflection surface and is a surface that has the strongest optical power in the ocular optical system. On the flat surface of the lens 304 on the side of the right eye 302 of the observer, a λ/4 plate and a PBS of the reflection polarization plate are formed in order from the side of the right-eye image display element 308. At this time, a slow axis of the λ/4 plate on the side of the right-eye image display element 308 and a slow axis of the λ/4 plate on the side of the right eye 302 of the observer have an orthogonal relation. Accordingly, when the polarization direction in which light is transmitted through the polarization plate between the lens 305 and the side of the right-eye image display element 308, and the slow axis of the λ/4 plate are sloped at 45°, the slow axis of the λ/4 plate of the flat surface of the lens 304 on the side of the right eye 302 of the observer are sloped at −45°. The polarization direction in which light is transmitted through the polarization plate between the lens 305 and the side of the right-eye image display element 308 and the polarization direction in which light is transmitted through the PBS are orthogonal to each other.

Due to the above configuration, light emitted from the right-eye image display element 308 is transmitted through the polarization plate to become linearly polarized and is transmitted through the λ/4 plate to become circularly polarized light. The light is transmitted through the half mirror and is transmitted through the λ/4 plate to become linearly polarized light, and the polarization direction of the linearly polarized light is orthogonal to the polarization direction of the light transmitting through the PBS. Therefore, the light is reflected from the PBS and is transmitted through the λ/4 plate to become circularly polarized light. The light is reflected from the half mirror and is transmitted through the λ/4 plate to become linearly polarized light. However, since the polarization direction of the linearly polarized light matches the polarization direction in which the light is transmitted through the PBS, the light is transmitted through the PBS to be guided to the right eye 302 of the observer. Similar optical paths apply to the left-eye ocular optical system.

By realizing the optical system in which optical paths are folded up using the polarized light as in the embodiment, it is possible to shorten a focal distance of a thin die and the ocular optical system and it is possible to realize observation of a wide angle image. Since the HMD is a head-mounted image display device, the weight of the HMD is preferably lightweight. Therefore, lenses included in an ocular optical system are preferably made of a resin that has a lower specific gravity than glass. In the embodiment, all the lenses are resin lenses.

Figure 11A:
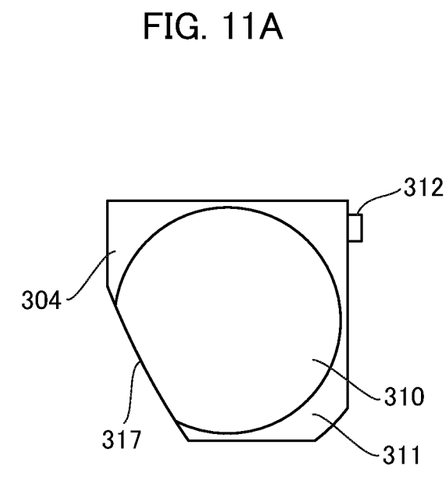
FIGS. 11A and 11B are diagrams illustrating the position of a forming gate of a lens 304 of a right-eye ocular optical system according to the third embodiment.
Figure 11B:
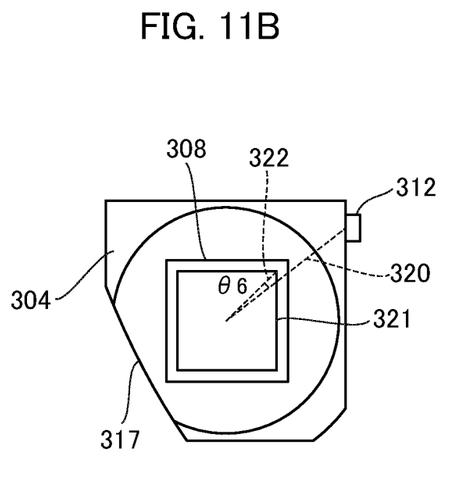

FIGS. 11A and 11B are diagrams illustrating the position of a forming gate of a lens 304 of the right-eye ocular optical system according to the third embodiment. The position of the forming gate of the lens 304 of the right-eye ocular optical system will be described with reference to FIGS. 11A and 11B. FIG. 11A is a diagram illustrating an example of a position of the forming gate of the lens 304. A forming gate 312 is formed in a part of the outer periphery of the lens 304. A non-optical effective region 311 is formed in the periphery of an optical effective region 310 and the forming gate 312 is disposed outside the non-optical effective region 311. Due to the presence of the non-optical effective region 311, the optical effective region 310 and the forming gate 312 are away from each other. Thus, even when birefringence is large near the forming gate 312, an influence of the birefringence is hardly imparted to the optical effective region 310.

As illustrated in FIG. 11B, a line 320 is a straight line connecting the center of the forming gate 312 to a point on the optical axis of the lens 304 in the cross section perpendicular to the optical axis. A line 322 is a straight line connecting a point on the optical axis of the lens 304 to an apex of the image display region 321 closest to the forming gate 312. An absolute value of an angle θ6 formed between the straight lines 320 and 322 is 10° and the forming gate 312 is disposed in an apex direction of an observed image. The apex direction in the observed image is a direction in which a field angle is the largest. Even when quality degrades due to birefringence in the direction, the birefringence is hardly conspicuous. Therefore, an absolute value of the angle θ6 formed between the straight lines 320 and 322 is preferably equal to or less than 30°. More preferably, the absolute value of the angle is equal to or less than 15°.

As a method of reducing birefringence near the forming gate, increasing a cross-sectional area of the forming gate is considered. A cross-sectional area S of the forming gate of the lens 304 is 4 mm×2 mm=8 mm$^2$. To reduce an influence of birefringence near the forming gate in the optical effective region, a method of keeping the position of the forming gate away from the optical effective region is considered. A shortest distance L between the optical effective region 310 and the forming gate 312 is 5 mm. Therefore, $L/S^{1/2}$ of the lens 304 is 1.8.

Figure 12A:
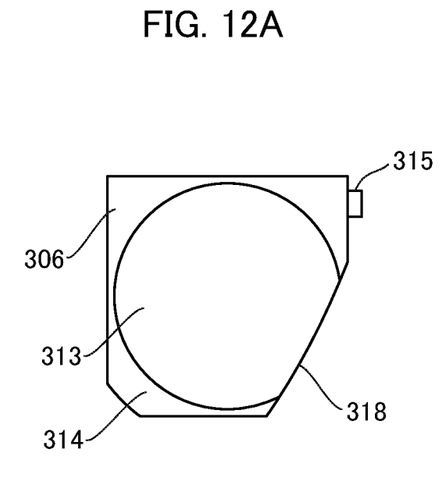
FIGS. 12A and 12B are diagrams illustrating the position of a forming gate of a lens 306 of a left-eye ocular optical system according to the third embodiment.
Figure 12B:
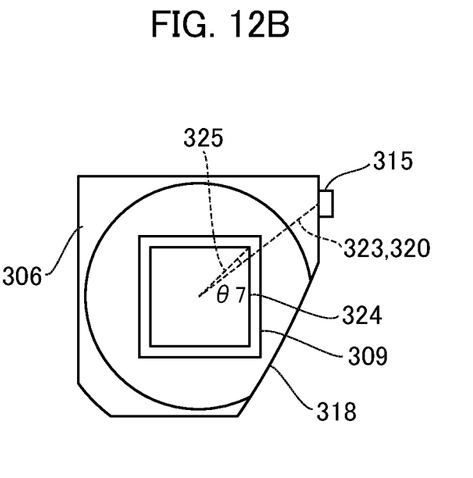

Next, a position of a forming gate of the lens 306 of the left-eye ocular optical system will be described with reference to FIGS. 12A and 12B. FIGS. 12A and 12B are diagrams illustrating the position of a forming gate of the lens 306 of a left-eye ocular optical system according to the third embodiment. FIG. 12A is a diagram illustrating an example of the position of the forming gate of the lens 306. A forming gate 315 is formed in a part of the outer periphery of the lens 306. A non-optical effective region 314 is formed in the periphery of an optical effective region 313 and the forming gate 315 is disposed outside the non-optical effective region 314. Due to the presence of the non-optical effective region 314, the optical effective region 313 and the forming gate 314 are away from each other. Thus, even when the birefringence near the forming gate 315 is large, an influence of the birefringence is hardly imparted to the optical effective region 313.

As illustrated in FIG. 12B, a line 323 is a straight line connecting the center of the forming gate 315 to a point on the optical axis of the lens 306 in the cross section perpendicular to the optical axis. A line 325 is a straight line connecting a point on the optical axis of the lens 306 to an apex of the image display region 324 closest to the forming gate 315. An absolute value of an angle θ7 formed between the straight lines 323 and 325 is 10° and the forming gate 315 is disposed in an apex direction of an observed image. The apex direction in the observed image is a direction in which a field angle is the largest. Even when quality degrades due to birefringence in the direction, the birefringence is hardly conspicuous.

A cross-sectional area S of the forming gate of the lens 306 is 4 mm×2 mm=8 mm$^2$. A shortest distance L between the optical effective region 313 and the forming gate 315 is 5 mm. Therefore, $L/S^{1/2}$ of the lens 306 is 1.8.

As illustrated in FIGS. 11A to 12B, in the embodiment, the positions of the forming gates of the lenses 304 and 306 are aligned on the upper right side. This is because when the observer observes images of which the influences of the birefringence are similar on the left and right images at the time of observing the HMD, the observer can observe fused images with both eyes comfortably. If locations at which quality degrades due to the influence of birefringence are considerably different on the left and right images due to a difference in the position of the forming gate between the left and right lenses, the observer may not observe the fused images comfortably due to occurrence of visual rivalry when the observer observes the fused images with both eyes. In addition, the observer recognizes a worse image from the images of which quality degrades on the right and left sides and recognizes as if both the left and right images were the worse images.

Therefore, the positional relationships of the forming gates of the left and right lenses are preferably similar. In the embodiment, an absolute value of a difference between the straight line 320 connecting the center of the forming gate 312 to the point on the optical axis of the lens 304 in the cross section perpendicular to the optical axis and the straight line 323 connecting the center of the forming gate 315 to the point on the optical axis of the lens 306 is 0°. In other words, when the point on the optical axis of the lens 304 and the point on the optical axis of the lens 306 overlap, an absolute value of an angle φ2 formed between the straight lines 320 and 323 is 0°. In FIGS. 12A and 12B, to facilitate the description, the straight line 320 connecting the center of the forming gate 312 to the point on the optical axis of the lens 304 is illustrated. In the drawing, since the angle φ2 formed between the straight lines 320 and 323 is 0°, the straight lines 320 and 323 are the same straight line. This numerical value is preferably equal to or less than 30°. In this way, the positional relationships of the forming gates of the left and right lenses are similar and the images in which the influences of the birefringence are similar on the left and right sides can be observed when the observer observes the HMD, and thus the observer can observe fused images with both eyes comfortably. More preferably, the angle is equal to or less than 15°.

As illustrated in FIG. 10, the HMD 301 has a nose relief portion 316 so that the nose of the observer is not hit when the observer wears the HMD 301 on his or her head. The nose relief portion has a shape in which the end surfaces of the lenses are slanted (notches are formed or chamfers are formed) in the lower left of the right-eye lens and the lower right of the left-eye lens to avoid interference with the nose of the user (a nose relief shape). Specifically, as illustrated in FIGS. 11A and 11B, a first nose relief portion 317 is provided so that the end portion of the lower left of the right-eye lens is formed in a surface shape slanting downwards from the left to the right. Similarly, as illustrated in FIGS. 12A and 12B, a second nose relief portion 318 is provided so that the end portion of the lower right of the left-eye lens is formed in a surface shape slanting downwards from the right to the left. The first nose relief portion 317 and the second nose relief portion 318 are more chamfered (recessed/cut off) than other corners of the lenses. In other words, when distances between the optical axis of the lens to four corners of the lens in the diagonal directions are compared, the distance between the optical axis and the corner closest to the first nose relief portion 317 or the second nose relief portion 318 is shorter than the other three distances (preferably, the distance is shorter 0.9 times the longest distance among the other three distances (more preferably, 0.8 times)). Here, the diagonal direction is a diagonal direction of the image display element (the rectangular image display region).

When the lenses included in the ocular optical system have a nose relief shape, the shapes of the left and right lenses such as the lenses 304 and 306 are not the same and bilateral symmetric. Therefore, when the lenses are manufactured by mold-forming, it is preferable to form the left and right lenses by one mold. In this way, it is possible to further reduce mold manufacturing cost and shorten a time in which the left and right lenses are formed than when left and right molds are each manufactured.

Figure 13A:
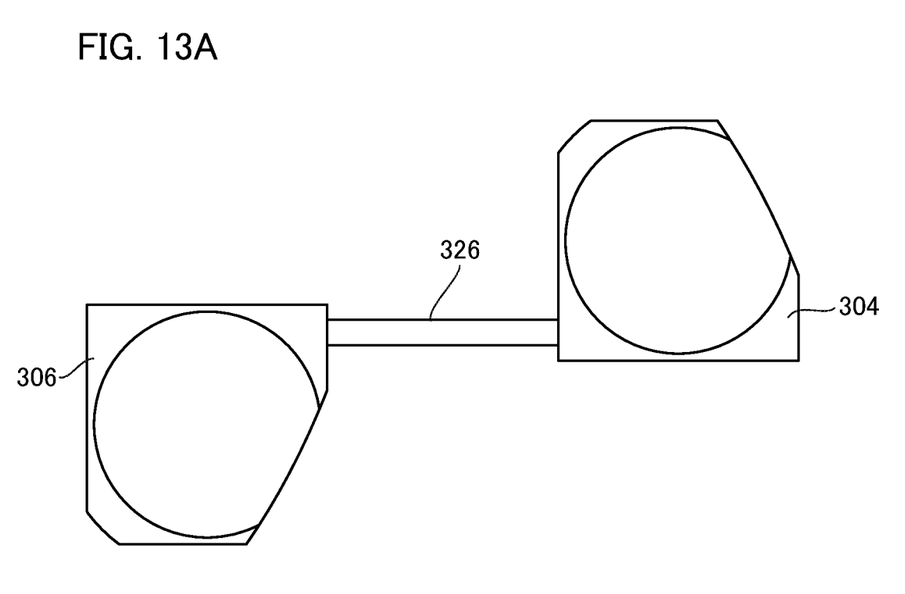
FIGS. 13A and 13B are diagrams illustrating mold-forming of left and right lenses.
Figure 13B:
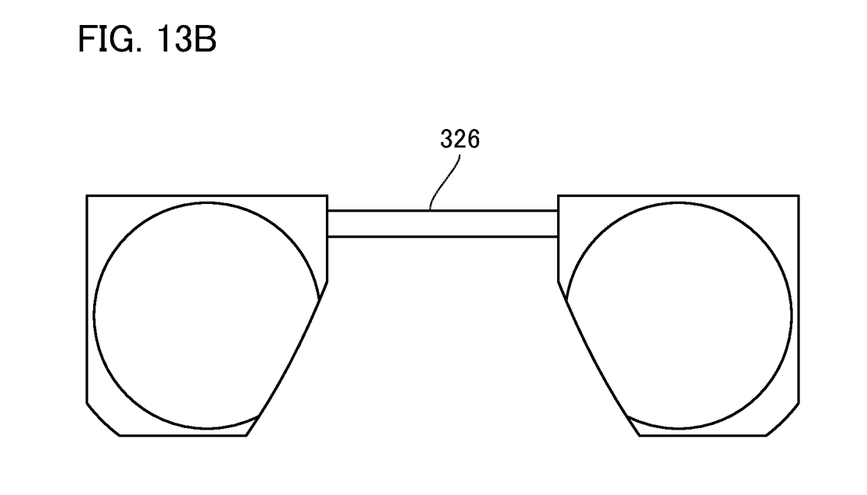

FIGS. 13A and 13B are diagrams illustrating mold-forming of left and right lenses. When the left and right lenses are formed by one mold, a forming runner 326 is presumed to be disposed, as illustrated in FIG. 13B. However, when the positions of the forming gates of the left and right lenses are aligned as in the embodiment, a forming runner may be disposed, as illustrated in FIG. 13A. In this way, the forming runner is disposed to form the left and right lenses and an ocular optical system is assembled so that the positions of the forming gates match the direction of the apex of the image display region with respect to a point on the optical axis of each ocular optical system. Thus, it is possible to manufacture the ocular optical system in which an influence of birefringence near the forming gate is small.

The positions of the forming gates of the lenses 305 and 307 are preferably aligned on the upper left side on which the positions of the forming gates of the lenses 304 and 306 are respectively away and are preferably formed by one mold in consideration of the nose relief shape. The positions of the forming gates of the lenses 304 and 305 and the respective positions of the forming gates of the lenses 306 and 307 are preferably disposed to be distant.

The forming gates of all the lenses included in the ocular optical system as in FIGS. 11A to 12B are disposed on the upper side. The reason for forming the forming gates on the upper side is that a human field of vision is larger on a lower side than on an upper side when the upper side is compared to the lower side, and there are many more opportunities to observe the lower side. Therefore, when degradation of quality occurs due to birefringence, it is more difficult for an observer to recognize the degradation on the upper side than on the lower side. Therefore, the forming gates are preferably disposed on the upper side.

Figure 14A:
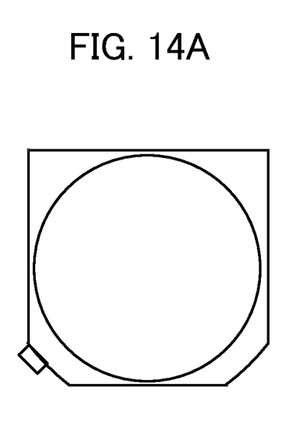
FIGS. 14A and 14B are diagrams illustrating processing of a nose relief portion of a lens.
Figure 14B:
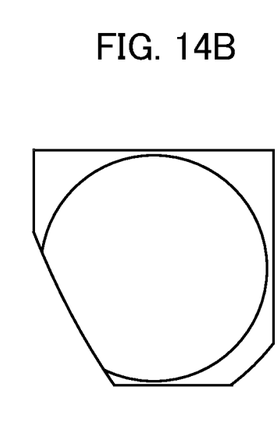

FIGS. 14A and 14B are diagrams illustrating processing of a nose relief portion of a lens. When a nose relief shape is formed in a lens as in the embodiment, for example, the lens is first formed in a state in which the lens has no nose relief shape as illustrated in FIG. 14A. The lens that has no nose relief shape is formed by causing a material to flow in a mold from the forming runner 326 of the mold. Thereafter, a method of manufacturing a nose relief portion in an additional process may be used. In this case, the nose relief portion may be processed so that the forming gate is removed (or cut off). That is, the forming gate and a part of a distorted region are removed to form the nose relief portion. By disposing the forming gate at a position corresponding to the nose relief portion, it is possible to get rid of a region in which birefringence near the forming gate is large in an additional process. Thus, it is possible to reduce the influence of the birefringence near the forming gate.

To reduce unnecessary ghost light and enhance contrast of an observed image, a polarization plate may be disposed after the PBS. In the embodiment, the image display element is the image display element that radiates unpolarized light as an organic EL. A polarization plate on the side of the image display element may not be disposed to realize a reduction in cost and a reduction in size by radiating linearly polarized light when using a liquid crystal display instead of the organic EL.

Other Embodiment

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-215326 filed on Nov. 16, 2018, which is hereby incorporated by reference herein in its entirety.

What is claimed is:
1. An image display device comprising:
an ocular optical system including a polarization element and configured to guide light from an image display element toward an eyeball of an observer, wherein the ocular optical system includes at least one optical element that has a forming gate mark in a part of an outer periphery, and wherein the forming gate mark is disposed in a direction of an apex of an image display region of the image display element with respect to a point on an optical axis of the ocular optical system in a cross section perpendicular to the optical axis of the ocular optical system.

2. The image display device according to claim 1, wherein the direction of the apex satisfies $|\theta A| \leq 30°$, where $\theta A$ is an angle formed between a straight line connecting the point on the optical axis to an apex of the image display region closest to the forming gate mark and a straight line connecting the point on the optical axis to the forming gate mark in the cross section perpendicular to the optical axis.

3. The image display device according to claim 1, wherein a non-optical effective region is disposed between an optical effective region of the optical element and the forming gate mark.

4. The image display device according to claim 1, wherein $1 \leq L/S^{1/2} \leq 4$ is satisfied, where S is a cross-sectional area of the forming gate mark and L is a shortest distance between the forming gate mark and an optical effective region of the optical element.

5. The image display device according to claim 1, wherein the optical element is a resin lens.

6. The image display device according to claim 1, wherein the ocular optical system includes a first resin lens that has a first forming gate mark in a part of an outer periphery and a second resin lens that has a second forming gate mark in a part of an outer periphery, and wherein $60° |\theta B| \leq 120°$ is satisfied, where $\theta B$ is an angle formed between a straight line connecting the point on the optical axis to the first forming gate mark and a straight line connecting the point on the optical axis to the second forming gate mark in the cross section perpendicular to the optical axis of the ocular optical system.

7. The image display device according to claim 1, wherein the image display device includes a right-eye ocular optical system guiding light from a right-eye image display element to a right eyeball of the observer and a left-eye ocular optical system guiding light from a left-eye image display element to a left eyeball of the observer, wherein the right-eye ocular optical system includes a right-eye resin lens that has a right-eye forming gate mark in a part of an outer periphery, wherein the left-eye ocular optical system includes a left-eye resin lens that has a left-eye forming gate mark in a part of an outer periphery, and wherein $|\phi| \leq 30°$) is satisfied, where $\phi$ is an angle formed between a straight line connecting a point on an optical axis of the right-eye ocular optical system to the right-eye forming gate mark and a straight line connecting a point on an optical axis of the left-eye ocular optical system to the left-eye forming gate mark in a cross section perpendicular to the optical axis of the right-eye ocular optical system.

8. The image display device according to claim 7, wherein each of the right-eye resin lens and the left-eye resin lens includes a nose relief portion.

9. The image display device according to claim 1, wherein the ocular optical system includes an optical system in which a first $\lambda/4$ plate, a semi-transmission reflection surface, a second $\lambda/4$ plate, and a reflection polarization plate that reflects first linearly polarized light and transmits second linearly polarized light orthogonal to the first linearly polarized light are disposed in this order from the image display element toward the eyeball of the observer.

10. The image display device according to claim 9, wherein an angle formed between a slow axis of the first $\lambda/4$ plate and a direction of the first linearly polarized light is 45° and an angle formed between a slow axis of the second $\lambda/4$ plate and the direction of the first linearly polarized light is −45°.

11. The image display device according to claim 9, wherein the image display element radiates unpolarized light and the ocular optical system includes a first polarization plate that transmits the first linearly polarized light between the image display element and the first $\lambda/4$ plate.

12. The image display device according to claim 9, wherein the ocular optical system includes a second polarization plate that transmits the second linearly polarized light between the reflection polarization plate and the eyeball of the observer.

13. An ocular optical system that includes a polarization element and guides light from an image display element toward an eyeball of an observer, and is used in an image display device, the ocular optical system comprising:

at least one optical element having a forming gate mark in a part of an outer periphery, wherein the forming gate mark is disposed in a direction of an apex of an image display region of the image display element with respect to a point on an optical axis of the ocular optical system in a cross section perpendicular to the optical axis of the ocular optical system.

14. The ocular optical system according to claim 13, wherein $1 \leq L/S^{1/2} \leq 4$ is satisfied, where S is a cross-sectional area of the forming gate mark and L is a shortest distance between the forming gate mark and an optical effective region of the optical element.

15. A method of manufacturing an ocular optical system that guides light from an image display element toward an eyeball of an observer via an optical element and a polarization element, the method comprising:

forming a forming gate mark in a part of an outer periphery of the optical element by causing a resin to flow in a die; and assembling the optical element so that the forming gate mark or a distorted region occurring near the forming gate mark is disposed in a direction of an apex of an image display region of the image display element with respect to a point on an optical axis of the ocular optical system in a cross section perpendicular to the optical axis.

16. The method of manufacturing the ocular optical system according to claim 15, further comprising:

forming a nose relief portion by removing parts of the forming gate mark and the distorted region.

17. A method of manufacturing an ocular optical system that includes a polarization element and guides light from an image display element to an eyeball of an observer, the method comprising:

mold-forming one optical element included in the ocular optical system by causing a material to flow from a gate of a mold; and assembling the optical element so that a gate mark of the optical element that remains in the mold-forming matches a direction of an apex of an image display region of the image display element with respect to a point on an optical axis of the ocular optical system in a cross section perpendicular to the optical axis.

* * * * *